United States Patent
Schumacher et al.

(10) Patent No.: US 9,309,847 B2
(45) Date of Patent: Apr. 12, 2016

(54) ARMATURE FOR A FUEL INJECTOR

(75) Inventors: Matthias Schumacher, Weissach (DE); Andreas Burghardt, Stuttgart (DE); Jochen Rager, Bisingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 112 days.

(21) Appl. No.: 14/237,704

(22) PCT Filed: Jun. 11, 2012

(86) PCT No.: PCT/EP2012/061015
§ 371 (c)(1),
(2), (4) Date: May 15, 2014

(87) PCT Pub. No.: WO2013/020740
PCT Pub. Date: Feb. 14, 2013

(65) Prior Publication Data
US 2014/0319392 A1   Oct. 30, 2014

(30) Foreign Application Priority Data
Aug. 9, 2011   (DE) .......................... 10 2011 080 693

(51) Int. Cl.
| | |
|---|---|
| *H01F 3/00* | (2006.01) |
| *F02M 51/06* | (2006.01) |
| *H01F 7/08* | (2006.01) |
| *H01F 7/129* | (2006.01) |
| *F02D 19/06* | (2006.01) |
| *F02D 19/08* | (2006.01) |

(52) U.S. Cl.
CPC .......... *F02M 51/0664* (2013.01); *H01F 7/081* (2013.01); *H01F 7/129* (2013.01); *F02D 19/0686* (2013.01); *F02D 19/084* (2013.01); *F02M 2200/02* (2013.01); *F02M 2200/08* (2013.01); *F02M 2200/8046* (2013.01); *F02M 2200/956* (2013.01); *H01F 2007/086* (2013.01); *Y02T 10/36* (2013.01)

(58) Field of Classification Search
CPC ..................................................... H01F 7/1638
USPC .......................................................... 335/279
See application file for complete search history.

(56) References Cited

U.S. PATENT DOCUMENTS

| | | | |
|---|---|---|---|
| 5,632,467 A | 5/1997 | Just et al. | |
| 5,955,934 A * | 9/1999 | Raj | ................ 335/277 |
| 6,130,595 A * | 10/2000 | Niimi | ............ 335/279 |

(Continued)

FOREIGN PATENT DOCUMENTS

| | | |
|---|---|---|
| CN | 101566116 A | 10/2009 |
| CN | 101828026 A | 9/2010 |

(Continued)

OTHER PUBLICATIONS

International Search Report for PCT/EP2012/061015, issued on Sep. 26, 2012.

*Primary Examiner* — Alexander Talpalatski
(74) *Attorney, Agent, or Firm* — Kenyon & Kenyon LLP

(57) ABSTRACT

An armature for an injector including at least one magnetic region and at least one non-magnetic region, the armature being developed as a one-piece component, the magnetic and non-magnetic regions being integrally connected to each other by a two-component powder injection molding process, and the magnetic region being completely enclosed by the non-magnetic region.

27 Claims, 2 Drawing Sheets

(56) References Cited

U.S. PATENT DOCUMENTS

| | | |
|---|---|---|
| 6,722,627 B2 * | 4/2004 | Murao et al. .............. 251/129.15 |
| 7,973,627 B2 * | 7/2011 | Yamagata et al. ............. 335/255 |
| 2003/0116739 A1 * | 6/2003 | Murao et al. ............. 251/129.15 |
| 2006/0097210 A1 | 5/2006 | Fong et al. |

FOREIGN PATENT DOCUMENTS

| | | |
|---|---|---|
| DE | 4415850 | 11/1995 |
| DE | 102009055133 A1 | 6/2011 |
| DE | 102009055156 | 6/2011 |
| EP | 0685643 A2 | 12/1995 |
| EP | 2172641 | 4/2010 |
| JP | H07208293 A | 8/1995 |
| JP | 2002021678 A | 1/2002 |
| JP | 2003049753 A | 2/2003 |
| JP | 2004042895 A | 2/2004 |
| JP | 2008539059 A | 11/2008 |
| JP | 2010281248 A | 12/2010 |

* cited by examiner

ARMATURE FOR A FUEL INJECTOR

FIELD OF THE INVENTION

The present invention relates to an armature for a fuel injector.

BACKGROUND INFORMATION

Fuel injectors of the related art, as are used e.g. in injection systems for gasoline engines, are constructed for example as solenoid valves having a solenoid and an armature, which is formed from a ferritic magnetic material and provided with a hard non-magnetic surface layer, e.g. made of chromium. Because of this construction, when building up and diminishing the magnetic field in operation, eddy current losses result and consequently a slowdown of the switching time or dynamics of the fuel injector. The manufacture of the armature is moreover very costly and complicated. In addition, the resistance against aggressive media such as ethanol or urea for example, which are increasingly contained in fuels, is insufficient to ensure a satisfactory durability of the injectors in countries with high fluctuations in fuel quality. Furthermore, in the future, the compliance with statutory regulations must be ensured especially with regard to the use of materials that represent health hazards.

SUMMARY

By contrast, the armature according to the present invention has the advantage that it has an eddy current-minimized and efficiency-enhanced magnetic circuit, which allows for higher dynamics with short switching times of the valve. Furthermore, by using suitable materials, an improved robustness or resistance to wear and protection against aggressive media such as e.g. ethanol etc. is provided. According to the present invention, this is achieved in that the armature includes at least one magnetic region and at least one non-magnetic region. For this purpose, the armature is developed as a one-piece powder injection molded component, and the magnetic and non-magnetic regions are connected to each other in integral fashion by a two-component powder injection molding process, the magnetic region being completely enclosed by the non-magnetic region. This makes it possible to implement the manufacture of the one-piece armature as a two-component powder injection molded part simply in a single process step and in time-optimized and cost-optimized fashion as a mass-produced part. The two-component powder injection molding method includes a ceramic injection molding step (ceramic injection molding, CIM) and/or a metal powder injection molding step (metal injection molding, MIM).

The armature preferably has an annular shape and a feed-through opening, and the non-magnetic region includes a first axial end face section, a second axial end face section, an inner circumferential section and an outer circumferential section, which have a high resistance to aggressive media and resistance to fuels used worldwide.

Also preferably, the first end face section facing an inner pole and the outer circumferential section have a lesser thickness than a thickness of the second end face section and a thickness of the inner circumferential section. The lesser thicknesses make it possible to achieve a high effective saturation induction in the magnetic region, which results in an increase in the magnetic force.

Also preferably, the thickness of the first end face section and the thickness of the outer circumferential section are identical. This achieves a good resistance to wear against the friction occurring in a relative frictional movement of the outer circumferential section on the valve sleeve. Moreover, a particularly compact design may thereby be achieved which provides for a minimized structural volume of the fuel injector as a whole. Alternatively, the first and second axial end face sections as well as the inner and outer circumferential sections may also be implemented at the same thickness.

The inner circumferential section preferably has the greatest thickness. This achieves a great wear resistance against friction in the guidance of the valve needle on the inner circumferential section without negatively affecting the magnetic efficiency. Alternatively, the second end face section may also be implemented at a greater thickness since this is also not magnetically relevant specifically at a smaller diameter. These cases, moreover, increase the proportion of less expensive material, which makes it possible to reduce overall costs.

Also preferably, the armature forms a stop on a first and/or second armature end face. Stop faces are thereby provided in the non-magnetic region from a cost-effective material having a high resistance to wear. This ensures a high robustness of the first end face section against the impact load occurring in an end stop on the inner pole. Furthermore, a cost-effective alternative to conventional coating methods such as hard chrome plating is provided, and the danger of the valve needle adhering to the magnetic region is thereby effectively suppressed.

The magnetic region is preferably developed from a magnet material of a high saturation induction. This allows for the targeted use of expensive magnetic material that is difficult to cut, such as one of FeCo or FeCrCo for example, in the areas of relevant magnetic lines of force of the armature, which contribute significantly to the magnetic force of the armature. Moreover, by using a magnet material such as e.g. FeCrCo having at least 13% Cr content or alternatively FeCo having at least 35% Co content it is possible to achieve an increased robustness with respect to fuel that contains additives such as ethanol or urea, and with respect to corrosion and cavitation. Also preferably, the non-magnetic region is developed from a ceramic material or a hard metal. The protective function of the non-magnetic region prevents a formation of Cr carbides associated with chromium-containing materials such as FeCrCo, which are the cause of the scattering of the magnetic values or magnetic circuits of the armature. The armature may be provided very cost-effectively as a one-piece two-component powder injection molded part.

The non-magnetic region is preferably developed from a fuel-resistant material. Furthermore, the non-magnetic region is preferably developed from a wear-resistant material. The use of fuel-resistant and/or wear-resistant materials improves the durability of the fuel injector.

The magnetic region preferably makes up 85 to 95% of the total weight of the armature, and the non-magnetic region 5 to 15% of the total weight of the armature. In addition to achieving a clear reduction in costs, the dynamic behavior desired in high-pressure fuel injectors is thereby clearly improved due to the achievable mass reduction and the lower eddy current losses.

DETAILED DESCRIPTION

Preferred exemplary embodiments of an armature 2 are described in detail below with reference to FIGS. 1 and 2. Identical components or functionally identical components are designated by identical reference symbols in the exemplary embodiments.

Figure 1:
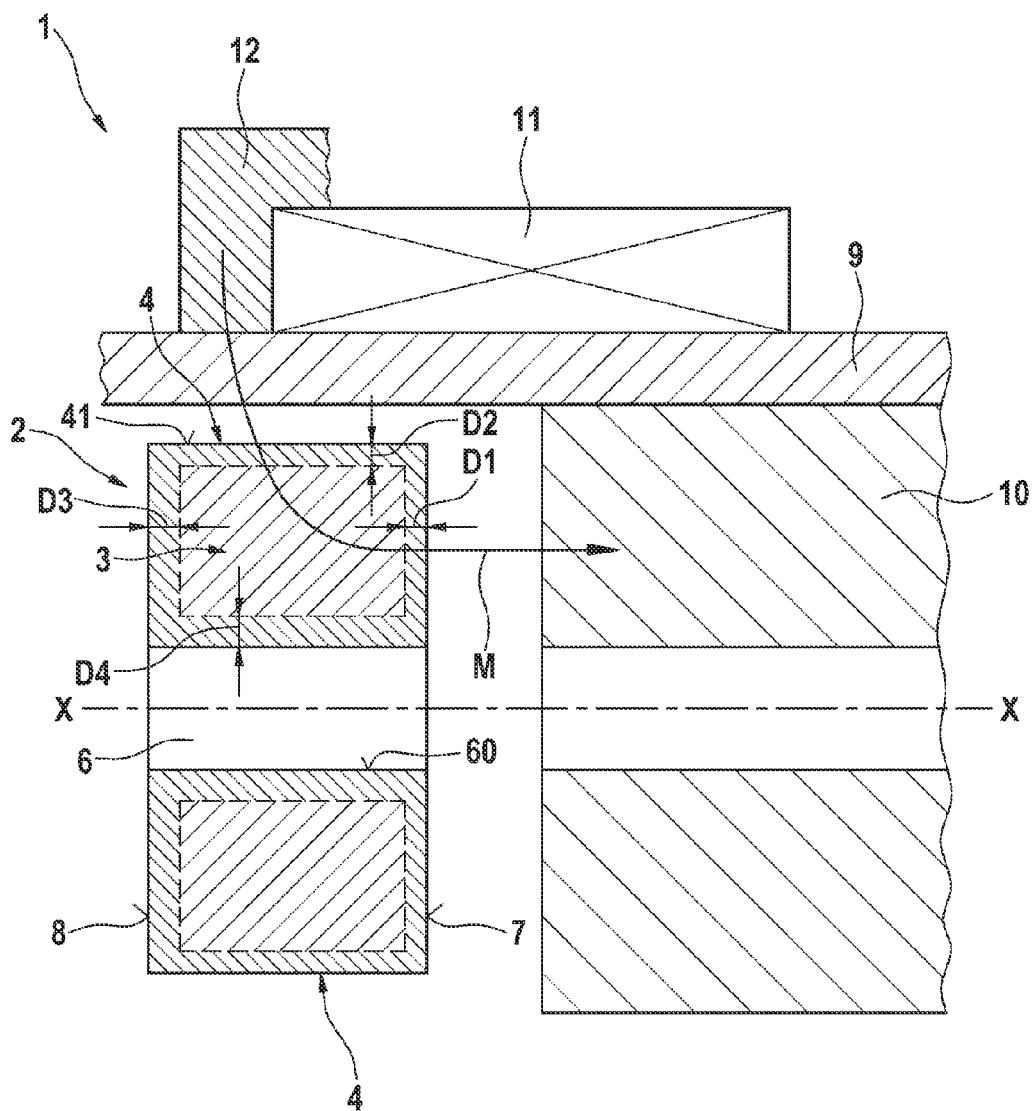
FIG. 1 shows an enlarged schematic sectional view of a fuel injector having an armature according to a first preferred exemplary embodiment of the present invention.

FIG. 1 shows a schematic sectional view of a part of a fuel injector 1 having a valve sleeve 9, at the outer side of which a housing 12 is attached within which a coil 11 is situated. An inner pole 10 and an armature 2 of a first exemplary embodiment are disposed in the interior of valve sleeve 9 along a center axis X-X. Armature 2 includes a cylindrical magnetic region 3 running along the center axis X-X, which is completely enclosed by a non-magnetic region 4. The one-piece annularly shaped armature 2 also has (like inner pole 10) a feed-through opening 6, in which a valve needle is guided that is not shown here. Magnetic region 3 is preferably made of a magnetic material having a high saturation induction at a low electrical conductivity such as FeCo, for example. Non-magnetic region 4 is preferably made from a ceramic material or hard metal. The magnetic and non-magnetic regions 3, 4 are integrally connected to each other by a two-component powder injection molding process.

As can be seen further from FIG. 1, non-magnetic region 4 includes a first axial end face section 7 of a thickness D1, a second axial end face section 8 of a thickness D3, an inner circumferential section 60 of a thickness D4 and an outer circumferential section 41 of a thickness D2. For this purpose, first end face section 7 forms a stop on inner pole 10. The course of effective magnetic lines of force is illustrated in exemplary fashion by a magnetic line of force M, which enters through valve sleeve 9 and outer circumferential section 41 into magnetic region 3 of armature 2 and proceeds from the latter through first end face section 7 in the direction of inner pole 10.

Thickness D1 of first end face section 7 facing inner pole 10 and thickness D2 of outer circumferential section 41 is preferably less than thickness D3 of second end face section 8 and thickness D4 of inner circumferential section 60. Due to the reduced thicknesses D1, D2 of first end face section 7 and outer circumferential section 41, which are passed by effective magnetic lines of force M, an improved effective saturation induction is achieved in magnetic region 3, which results in an increase in the magnetic force. Thicknesses D1 and D2 in this instance may be equal or different.

An armature 2, manufacturable cost-effectively and of a single piece, is thus provided as a two-component powder injection molded part having reduced eddy current losses and an increased magnetic efficiency, in which the hard enveloping coating in the form of non-magnetic region 4 protects the magnetic region 3 against contact with fuel. At the same time, a robust and wear-resistant armature stop is produced on one of the first and/or second end face sections 7 or 8 without contact with magnetic region 3. Furthermore, inner circumferential section 60 of feed-through opening 6 may function as a wear-resistant layer for guiding the valve needle in armature 2. This achieves a particularly long durability of the fuel injector, which also readily allows for a use in difficult conditions.

Figure 2:
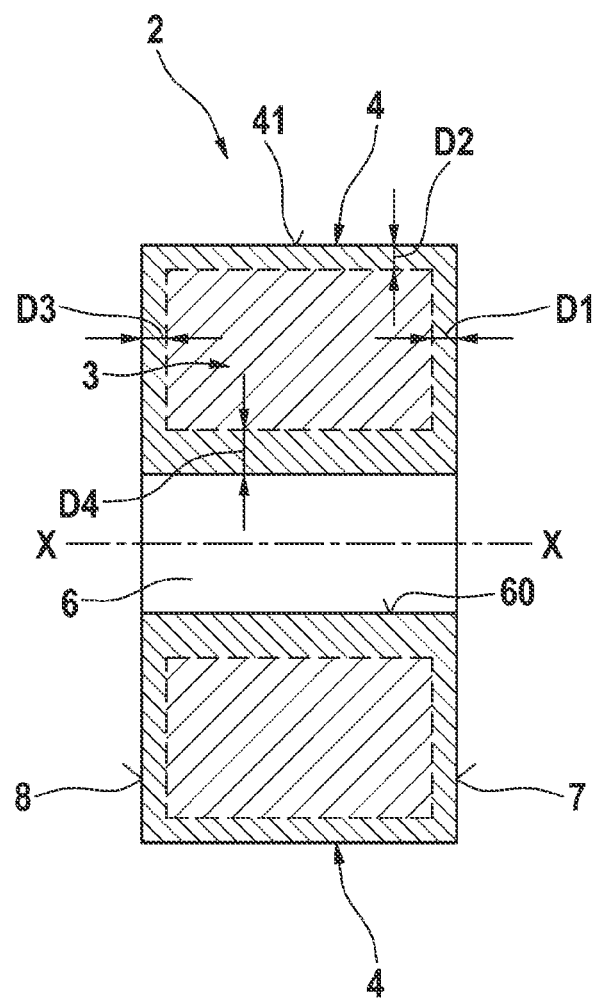
FIG. 2 shows an enlarged schematic sectional view of the armature according to a second preferred exemplary embodiment of the present invention.

In contrast to the previously described first exemplary embodiment, in armature 2 of the second exemplary embodiment of FIG. 2, inner circumferential section 60 has the thickness D4, which is greater than thicknesses D1, D2, D3 of first end face section 7, outer circumferential section 41 or second end face section 8. This makes it possible to manufacture larger parts of armature 2 from cost-effective and light non-magnetic material without negatively affecting the course of the magnetic lines of force. Thus a further minimization of magnetic region 3 and thus of the weight and the overall costs of armature 2 is achieved. As in the first exemplary embodiment, the magnetic and non-magnetic regions 3, 4 of armature 2 are also integrally connected to each other by the two-component powder injection molding process.

As shown in all exemplary embodiments, single-piece armatures 2 may thus be manufactured particularly economically as two-component powder injection molded parts for armature 2 of the present invention in a single manufacturing process, which is not possible by conventional manufacturing methods. In addition to a clearly improved cost-effectiveness, this markedly improves the dynamic behavior in accordance with the achievable mass reduction and the reduced eddy current losses desired and required in particular in high-pressure fuel injectors, which contributes to a significantly reduced fuel consumption and improved emission characteristics of the engine. Furthermore, the construction variants illustrated in the previously described exemplary embodiments may be combined at will.

What is claimed is:

1. An armature for an injector, comprising:
    at least one magnetic region; and
    at least one non-magnetic region, wherein:
        the armature is configured as a one-piece component,
        the magnetic and non-magnetic regions are integrally connected to each other as a two-component powder injection molding part, and
        the magnetic region is completely enclosed by the non-magnetic region;
    wherein the armature has an annular shape with a feed-through opening,
    wherein the non-magnetic region includes a first axial end face section, a second axial and face section, an inner circumferential section, and an outer circumferential section,
    wherein the first axial end face section faces an inner pole, and
    wherein the outer circumferential section has a lesser thickness than a thickness of the second axial end face section and a thickness of the inner circumferential section.

2. An armature for an injector comprising:
    at least one magnetic region; and
    at least one non-magnetic region, wherein:
        the armature is developed as a one-piece component,
        the magnetic and non-magnetic regions are integrally connected to each other as a two-component powder injection molding part, and
        the magnetic region is completely enclosed by the non-magnetic region;
    wherein the armature has an annular shape with a feed-through opening,
    wherein the non-magnetic region includes a first axial end face section, a second axial and face section, an inner circumferential section, and an outer circumferential section,
    wherein the first axial end face section faces an inner pole, and
    wherein a thickness of the first axial end face section and a thickness of the outer circumferential section are identical.

3. The armature as recited in claim 1, wherein the inner circumferential section has a greater thickness than the thickness of the outer circumferential section and than the thickness of the second axial end face section.

4. The armature as recited in claim 1, wherein the armature forms a stop on at least one of a first and a second armature end face.

5. The armature as recited in claim 1, wherein:
the magnetic region is configured from a magnetic material having a high saturation induction, and
the non-magnetic region is configured from one of a ceramic material and a hard metal.

6. The armature as recited in claim 1, wherein the non-magnetic region is configured from a fuel-resistant material.

7. The armature as recited in claim 1, wherein the non-magnetic region is configured from a wear-resistant material.

8. The armature as recited in claim 1, wherein the magnetic region makes up 85 to 95% of the total weight of the armature, and the non-magnetic region 5 to 15% of the total weight of the armature.

9. The armature as recited in claim 1, wherein the armature forms a stop on at least one of a first and a second armature end face, wherein the magnetic region is configured from a magnetic material having a high saturation induction, and wherein the non-magnetic region is configured from one of a ceramic material and a hard metal.

10. The armature as recited in claim 1, wherein the armature forms a stop on at least one of a first and a second armature end face, and wherein the non-magnetic region is configured from a fuel-resistant material.

11. The armature as recited in claim 1, wherein the armature forms a stop on at least one of a first and a second armature end face, and wherein the non-magnetic region is configured from a wear-resistant material.

12. The armature as recited in claim 11, wherein the magnetic region makes up 85 to 95% of the total weight of the armature, and the non-magnetic region 5 to 15% of the total weight of the armature.

13. The armature as recited in claim 9, wherein the magnetic region makes up 85 to 95% of the total weight of the armature, and the non-magnetic region 5 to 15% of the total weight of the armature.

14. The armature as recited in claim 10, wherein the magnetic region makes up 85 to 95% of the total weight of the armature, and the non-magnetic region 5 to 15% of the total weight of the armature.

15. A fuel injector, comprising:
a coil;
a valve sleeve;
a housing attached to an outer side of the valve sleeve, wherein the coil is situated within the housing;
an inner pole; and
an armature, including at least one magnetic region, and at least one non-magnetic region, wherein the inner pole and the armature are disposed in an interior of the valve sleeve along a center axis, and wherein:
the armature is configured as a one-piece component,
the magnetic and non-magnetic regions are integrally connected to each other as a two-component powder injected molded part, and
the magnetic region is completely enclosed by the non-magnetic region.

16. The fuel injector as recited in claim 15, wherein:
the armature has an annular shape with a feed-through opening,
the non-magnetic region includes a first axial end face section, a second axial and face section, an inner circumferential section, and an outer circumferential section,
the first axial end face section faces the inner pole, and
the outer circumferential section has a lesser thickness than a thickness of the second axial end face section and a thickness of the inner circumferential section.

17. The fuel injector as recited in claim 15, wherein:
the armature has an annular shape with a feed-through opening,
the non-magnetic region includes a first axial end face section, a second axial and face section, an inner circumferential section, and an outer circumferential section,
the first axial end face section faces the inner pole, and
a thickness of the first axial end face section and a thickness of the outer circumferential section are identical.

18. The fuel injector as recited in claim 15, wherein the armature forms a stop on at least one of a first and a second armature end face, wherein the magnetic region is configured from a magnetic material having a high saturation induction, and wherein the non-magnetic region is configured from one of a ceramic material and a hard metal.

19. The fuel injector as recited in claim 15, wherein the armature forms a stop on at least one of a first and a second armature end face, and wherein the non-magnetic region is configured from a fuel-resistant material.

20. The fuel injector as recited in claim 15, wherein the armature forms a stop on at least one of a first and a second armature end face, and wherein the non-magnetic region is configured from a wear-resistant material.

21. The fuel injector as recited in claim 20, wherein the magnetic region makes up 85 to 95% of the total weight of the armature, and the non-magnetic region 5 to 15% of the total weight of the armature.

22. The fuel injector as recited in claim 18, wherein the magnetic region makes up 85 to 95% of the total weight of the armature, and the non-magnetic region 5 to 15% of the total weight of the armature.

23. The fuel injector as recited in claim 19, wherein the magnetic region makes up 85 to 95% of the total weight of the armature, and the non-magnetic region 5 to 15% of the total weight of the armature.

24. A method for making an armature for a fuel injector, the method comprising:
providing a first armature part having a magnetic region;
providing a second armature part having a non-magnetic region, wherein the second armature part is arranged so that the non-magnetic region is completely enclosed by the non-magnetic region; and
integrally connecting the first armature part and the second armature part to each other by a powder injection molding process, so as to form the first and second armature parts into the armature which is a two-component powder injection molding part, wherein the armature has a feed-through opening for receiving a valve needle.

25. The method of claim 24, wherein the first armature part having the magnetic region is made of a magnetic material having a high saturation induction at a low electrical conductivity, and wherein the second armature part having the non-magnetic region is made from a ceramic material or a hard metal.

26. The method as recited in claim 24, wherein:
the armature has an annular shape with the feed-through opening,
the non-magnetic region includes a first axial end face section, a second axial and face section, an inner circumferential section, and an outer circumferential section, the first axial end face section faces an inner pole, and
the outer circumferential section has a lesser thickness than a thickness of the second axial end face section and a thickness of the inner circumferential section.

27. The method as recited in claim 24, wherein:
the armature has an annular shape with the feed-through opening,
the non-magnetic region includes a first axial end face section, a second axial and face section, an inner circumferential section, and an outer circumferential section,
the first axial end face section faces an inner pole, and
a thickness of the first axial end face section and a thickness of the outer circumferential section are identical.

* * * * *